A. Kloman.
Making Piles for Girder-Beam.
N° 75770. Patented Mar. 24, 1868
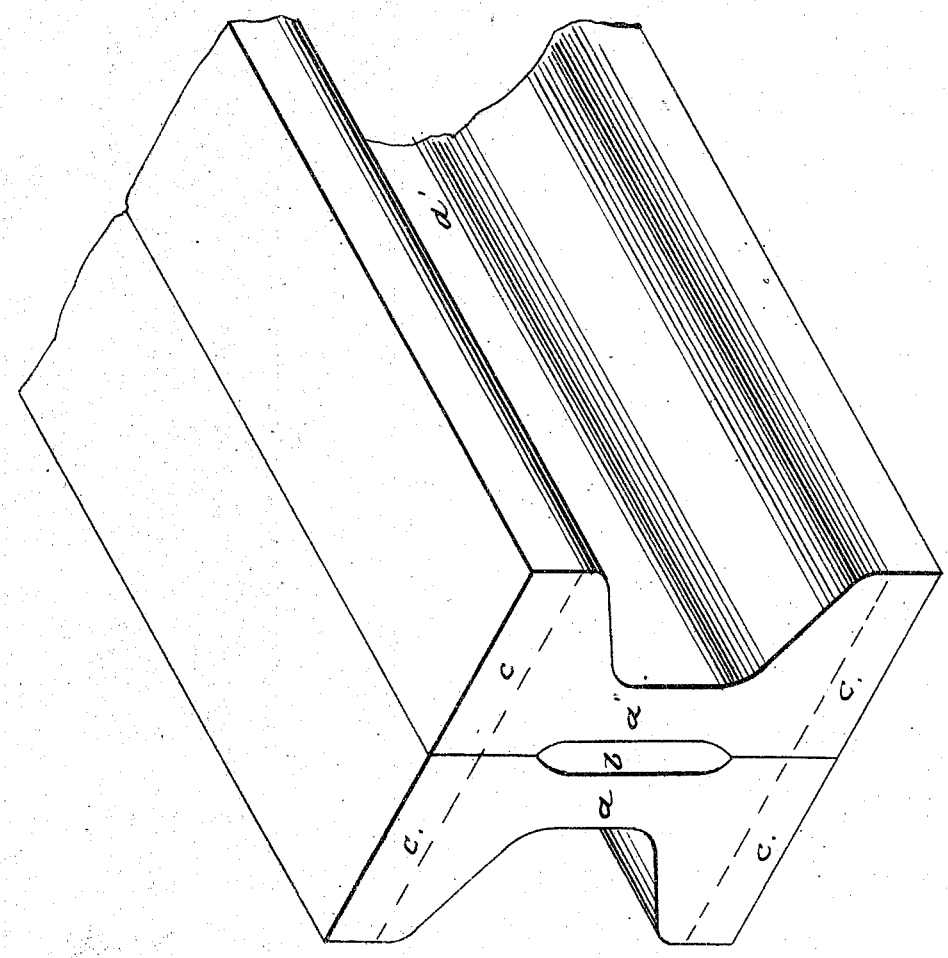
Attest:
W. D. Lewis
G. B. Cushing.
Inventor,
Andrew Kloman
by Bakewell & Christy
his Attys.

United States Patent Office.

ANDREW KLOMAN, OF PITTSBURG, PENNSYLVANIA.

Letters Patent No. 75,770, dated March 24, 1868.

IMPROVEMENT IN MAKING PILES FOR GIRDER-BEAMS.

*The Schedule referred to in these Letters Patent and making part of the same.*

TO ALL WHOM IT MAY CONCERN:

Be it known that I, ANDREW KLOMAN, of the city of Pittsburg, in the county of Allegheny, and State of Pennsylvania, have invented a new and useful Improvement in Making Piles for Girder-Iron; and I do hereby declare the following to be a full, clear, and exact description thereof, reference being had to the accompanying drawing, making a part of this specification, which is a perspective view of one end of my improved fagot, and to the letters of reference marked thereon.

The nature of my invention consists in rolling each half of the pile or fagot in a separate piece, the plane of division running longitudinally and vertically through the web, and in hollowing out or grooving the inner faces of such half fagots, so as to leave an aperture running lengthways through the pile or fagot, so as the more easily to raise it to a welding heat.

To enable others skilled in the art to make and use my invention, I will proceed to describe its construction and mode of use.

$a\ a'$ are two half fagots with grooved or U-shaped outer faces, and so made that when welded together the plane of the weld shall pass vertically and longitudinally through the web of the fagot. But the inner faces of each of these half fagots $a\ a'$, I hollow out slightly, or groove while rolling them, so that when put together they shall leave an aperture, $b$, extending along through the web, lengthways of the fagot. The pile or fagot is then heated in a furnace in the usual way, and reduced and drawn between rolls, of the usual construction, into a girder-beam. The object of the aperture $b$ is to allow the heat to pass through and secure more perfectly a welding heat throughout the pile or fagot.

A girder-beam rolled from a pile or fagot thus made is particularly strong, as the only line of weld which it has forms a plane parallel with the direction of the strain to which the beam is subject; and by raising the middle of the pile to a welding heat through the aperture $b$, I make that weld as perfect as possible.

The cap and base of the pile may be formed in part of separate plates, $c\ c$, the dotted lines indicating the planes of division.

What I claim as my invention, and desire to secure by Letters Patent, is—

Grooving those parts of a pile or fagot for making girder-beams which, when rolled, are to form the web of the beam, so as to secure an aperture, $b$, along through the heart of the pile or fagot, substantially as and for the purposes hereinbefore set forth.

In testimony whereof I, the said ANDREW KLOMAN, have hereunto set my hand.

ANDREW KLOMAN.

Witnesses:
A. S. NICHOLSON,
G. H. CHRISTY.